Oct. 24, 1967 J. BEREZNAK 3,349,186
ELECTRONICALLY CONTROLLED GLASS REED SWITCHING NETWORK
Filed Dec. 26, 1963 2 Sheets-Sheet 1

INVENTOR.
JOHN BEREZNAK
BY
Phillip A. Weiss
ATTORNEY

Oct. 24, 1967 J. BEREZNAK 3,349,186

ELECTRONICALLY CONTROLLED GLASS REED SWITCHING NETWORK

Filed Dec. 26, 1963 2 Sheets-Sheet 2

3,349,186

ELECTRONICALLY CONTROLLED GLASS REED SWITCHING NETWORK

John Bereznak, Oak Lawn, Ill., assignor to International Telephone and Telegraph Corporation, New York, N.Y., a corporation of Maryland Filed Dec. 26, 1963, Ser. No. 333,430
4 Claims. (Cl. 179—18)

ABSTRACT OF THE DISCLOSURE

A switching system combining the higher potential capacity and multipath capabilities of glass reed contact crosspoints the self-seeking features of PNPN diode crosspoints. The diodes control the glass reed relay which actually carry the communication signals.

This invention relates to glass reed switching networks and more particularly, to electronic switching arrangements for controlling a matrix of glass reed contacts.

Networks of the type described herein extend connections from an inlet demanding service through a plurality of crosspoints to a selected outlet. Generally, these networks are arranged in a plurality of cascaded stages to minimize the number of crosspoints required for completing many simultaneous connections. Usually input circuits (such as telephone subscriber lines, for example) are connected to the input of a primary stage and output circuits (such as control links, for example) are connected to the output of a secondary stage. Thus, at least one primary and one secondary stage is required to complete each connection through an exchange. One example of a network such as this is found in my U.S. Patent No. 3,201,520 entitled "Electronic Switching Matrix," Ser. No. 145,220, filed Oct. 16, 1961, and assigned to the assignee of this invention.

Previous solid state crosspoint networks have incorporated self-seeking capabilities which eliminated the need for in-network control circuits. Switch paths through these networks are completely self-seeking, guided only by various non-controlled circuit variations, such as the random variations which occur in all components having a spread of manufacturing tolerances. These networks have reached a highly developed state where they admirably perform their appointed functions. However, these previous networks do not readily lend themselves to multi-path crosspoints. In addition, there are occasions where a completed path cannot carry signals have certain characteristics. For example, sometimes the completed path must carry extremely heavy currents or high potentials which exceed the solid state crosspoints capabilities. Other times it may be necessary to completely remove all current from the paths—as during certain telegraph or telemeter signaling—and thereby cause the paths to release. On still other occasions, the open crosspoint isolation requirements cannot be economically met with readily available solid state devices.

Accordingly, an object of this invention is to provide new and improved self-seeking networks having crosspoints with capabilities that exceed the capabilities of individual solid state devices previously used at the crosspoint. In particular, an object is to provide new and improved self-seeking networks for establishing a supervision path through a network. The supervision path is used to control the operation of glass reed contact switching network.

Another object of this invention is to provide new and improved matrices of glass reed contacts. In this connection, an object is to provide an all-electronic control circuit for such glass reed contact matrices. More specifically, an object is to give self-seeking capabilities to glass reed contact matrices.

Yet another object of the invention is to provide extremely large, all-electronically controlled, switching networks having a capacity for switching through many cascaded stages. Here, an object is to separate the maximum practical number of signal carrying paths from the electronic components which may be included in a single switching path. In particular, an object is to separate signal carrying crosspoints from the solid state switching devices that control such crosspoints.

In accordance with one aspect of this invention, a plurality of horizontal and vertical multiples are arranged in intersecting relationship to provide switching matrices for a switching network. Each multiple has a supervisory conductor and at least one communication conductor. Electronic crosspoint switches extend from the horizontal to the vertical supervisory conductor at each multiple intersection. Each crosspoint switch comprises a series circuit including a four layer diode and a winding for operating at least one set of glass reed relay contacts. The glass reed relay contacts extend from horizontal to vertical communication conductors at each multiple intersection. The contacts at each intersection are controlled by the crosspoint switch at the same intersection. When an input is marked as by a calling party going off hook the four layer diodes in the supervisory circuits attached to the marked input fire through. These four layer diodes provide an end-marked network for extending self-seeking, current controlled paths from marked input demanding service through the network to a selected outlet. After sufficient diodes fire to complete a supervisory path, the current in the series windings build up until sufficient flux is generated to operate the glass reed contacts controlled by each winding. The operated glass reed contacts complete a principal communication path through the matrices of the network for carrying intelligence. Thereafter, and for the duration of a call, the diodes in the supervision path serve as a memory of crosspoint operation.

The above mentioned and other objects and features of this invention and the manner of obtaining them will become more apparent and the invention itself will be best understood by reference to the following description of an embodiment of the invention taken in conjunction with the accompanying drawings in which.

Figure 1:
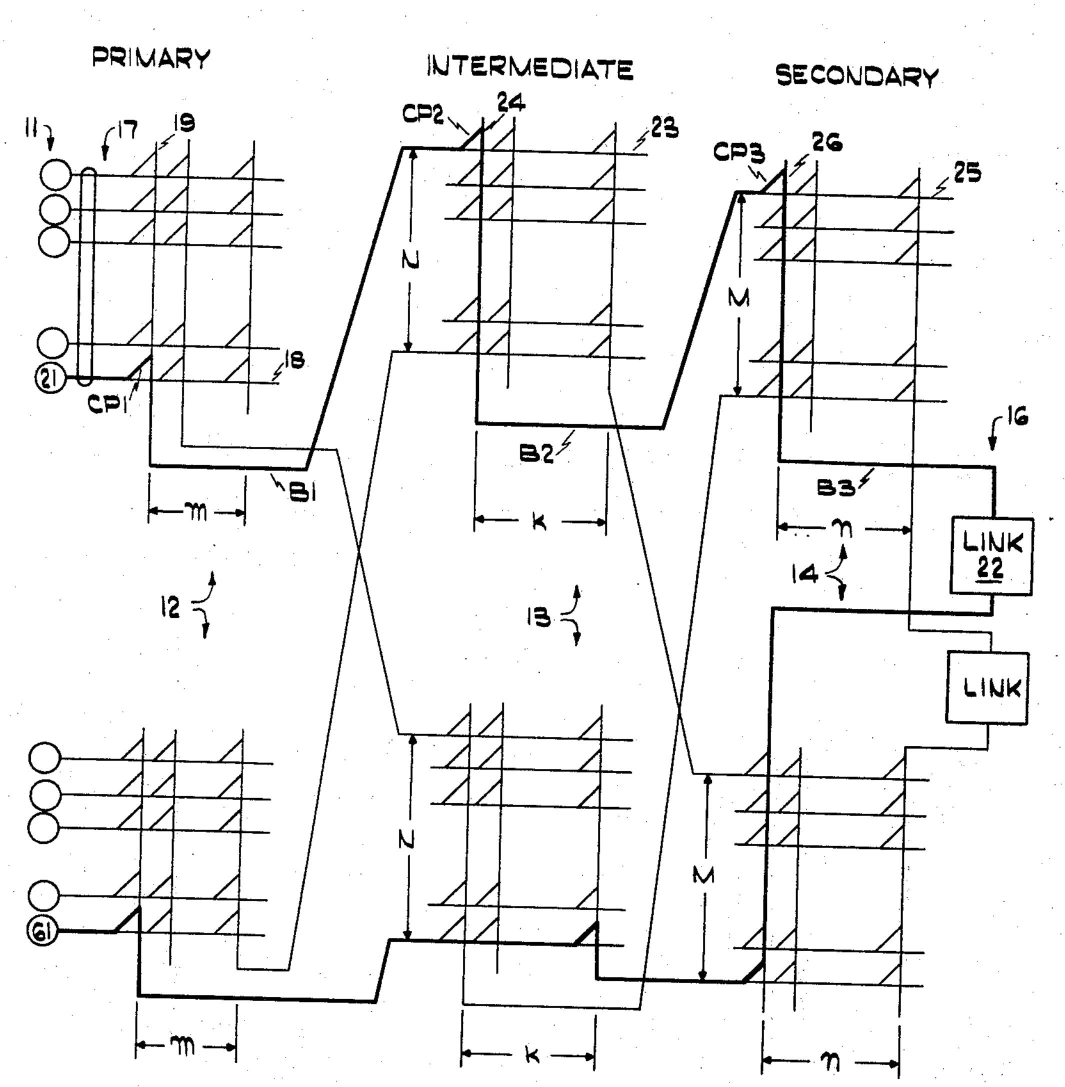
FIG. 1 is a diagram showing an exemplary exchange using a switching network utilizing the principles of this invention.

By way of example, FIG. 1 shows a plurality of cascaded matrices or switching arrays arranged to give automatic telephone service. The figure includes a plurality of line circuits 11, three stages of switching matrices 12–14, and a number of control links 16. The cascaded matrices are here designated "primary," "intermediate," and "secondary." The switching technique applies equally well, however, to five, seven, nine, etc. matrices or switching stage arrays. In a telephone system the line circuits may represent subscriber lines. In other systems, the line circuits may represent any other circuits which are to be electrically connected through the matrices.

In this exemplary system, there are a plurality of primary matrices 12, *m* number of intermediate matrices 13, *k* number of secondary matrices 14 and *n* number of links 16. Each primary matrix has a number of inlets 17 corresponding to the number of subscriber lines served by that matrix. These primary matrices have *m* outlets, selected on a traffic study basis, each outlet being connected to a corresponding inlet on intermediate matrices 13; therefore, each intermediate matrix *n* inlets. By a similar reasoning, the intermediate matrices 13 have *k* outlets and the secondary matrices 14 have *m* inlets and a number of *n* outlets equal to the number of links in each secondary group.

Each matrix includes a first and second (or horizontal and vertical) multiples, two of which are designated by way of example as 18, 19 respectively. The multiples are arranged to provide a number of intersecting crosspoints, one of which is shown at CP1. At each crosspoint, reed relay contacts controlled by an electronic switch, such as a PNPN diode, for example, serially coupled to a reed relay coil bridged by a unidirectional device is connected between the intersecting multiples. Thus, when the switch is turned "on," the intersecting multiples are electrically connected, and when the switch is "off," the intersecting multiples are electrically isolated from each other.

The electronic switches fire when a voltage in excess of a "firing" potential is applied across their terminals. The vertical multiples are normally biased by a first or common reference potential. Therefore, a crosspoint diode fires when a horizontal multiple is marked by a potential which exceeds a firing potential relative to the normal vertical or common reference potential. After a crosspoint fires, the marking potential on the horizontal multiple charges a capacitor connected to the intersecting vertical multiple and, hence, applies a voltage to a horizontal multiple of the next cascaded matrix. In this manner, the marking potential is passed on step-by-step to each succeeding cascaded matrix.

One end of a desired path through these cascaded matrices is marked from line circuits, and the other end is marked from suitable control equipment, such as the link circuits which are well known in automatic telephony. For example, a marking applied at a line circuit 21 and at link 22 might complete the path shown in FIG. 1 by a heavily inked line. Of course, many other paths to link 22 may be completed also. The heavily inked exemplary path includes horizontal multiple 18 on the primary matrix to which line 21 is connected. When line 21 is caused to mark horizontal 18, crosspoint CP1 operates to connect horizontal multiple 18 to vertical multiple 19. The vertical multiple, such as multiple 19, is connected through buses such as bus B1 to the horizontal multiples on the intermediate matrices. Crosspoint CP2 is operated in the same manner as crosspoint CP1 to connect the horizontal multiple 23 to the vertical multiple 24 on the intermediate matrix. Bus B2 connects the vertical multiple 24 on the intermediate matrix to a horizontal multiple 25 on the secondary matrix. The horizontal multiple 25 is coupled to vertical multiple 26 through operated crosspoint CP3. Vertical multiple 26 is connected to link 22 through bus B3. Thus, the call extends through the switching network from the marked input at line 21 to the selected output at bus B3. The call extends from link 22 to a marked called line, such as line 61, in a similar manner. The crosspoints switch through in a self-seeking manner.

Figure 2:
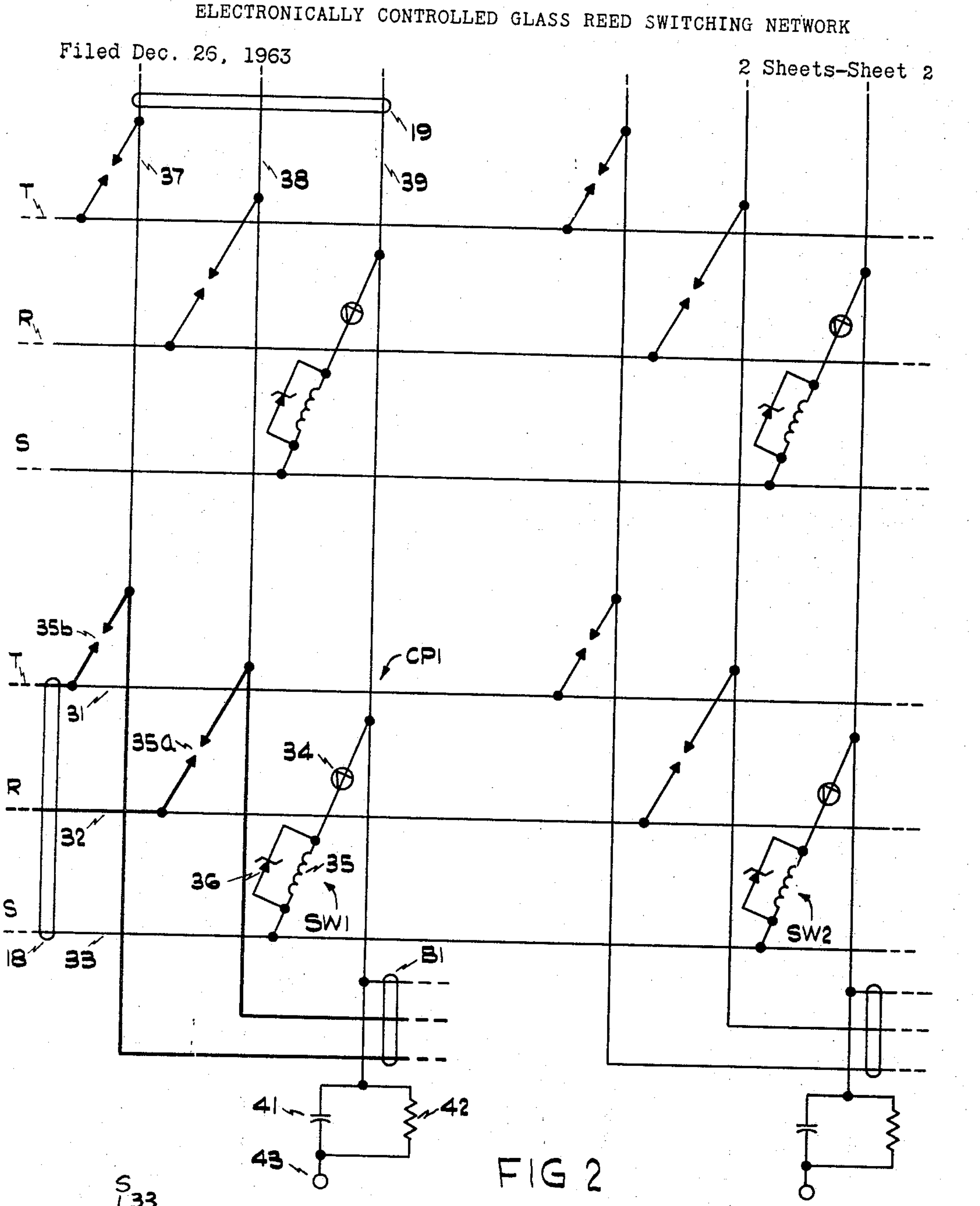
FIG. 2 shows exemplary solid state supervisory and reed relay contact signal crosspoints for use in the matrices of FIG. 1.

The exact nature of the crosspoints comprising this or similar paths through the matrices may be understood from a study of FIG. 2, which illustrates four exemplary crosspoints on the primary matrix including CP1. As shown therein, a line circuit, such as the line circuit 21, terminates in the well known tip ring and sleeve (T, R, and S) conductors. The tip and ring conductors (TR), shown as heavily inked lines in FIG. 2, carry the speech or intelligence signals and the sleeve conductor S carries the supervisory signals. As can be readily understood from FIG. 2 each multiple is comprised of a plurality of conductors. For example, the horizontal multiple 18 is comprised of conductors 31, 32 and 33 connected to the tip ring and sleeve conductors T, R, and S respectively.

The line circuits, such as line circuit 21, each include a pulse source (not shown) which is coupled to the sleeve conductors when marking is desired. For example, a marking is desired in a telephone system of this type either when a calling subscriber station goes off-hook or when a register acts to mark the line circuit of a called line. The structure that actually applies the marking may include any device capable of applying a voltage having a controlled use time.

The right-hand end of the speech path is marked from a link, such as link 22, by a steady and unvarying potential called a "link ground." Here it may be assumed that an allotter has preselected a first link to serve the next call in any well known manner.

Each crosspoint switch, such as switch SW1, includes a solid state device, such as PNPN diode 34. The diodes are symbolically shown by the number 4 in a circle. The apex of the 4 points in the direction that positive current flows. As those familiar with PNPN diodes know, the diode has an extremely high resistance between its two end terminals or electrodes until the voltage across these electrodes reaches firing potential. Thereafter, the diode switches on, and its resistance is extremely low. After switching on and as long as a minimum or holding current flows through the diode, it remains in its low resistance state. When the current falls below the holding value, however, the diode "starves," switches off, and returns to its high resistance state.

In series with each diode is a reed relay winding, such as coil 35 bridged by a unidirectional device, such as zener diode 36. Each winding controls the reed relay contacts, such as contacts **35*a* and 35*b*, necessary to connect the speech path through the crosspoint. The vertical multiple 19 comprises conductors 37, 38 and 39. The contacts 35*b* are connected to extend from conductor 31 to conductor 37 to connect the tip lead T to conductor 37 when contacts 35*b* are operated to a closed position. In a similar manner, contacts 35*a* extend from conductor 32 to conductor 38 to connect the ring lead R to vertical conductor 38 when contacts 35*a*** are operated to a closed position.

A marking on lead 33, such as a ramp front pulse, received over supervisory lead S causes a potential difference to appear across the solid state switches, such as switches SW1, SW2, etc. in parallel. Because of the firing characteristics of the PNPN diode one of the diodes, will fire responsive to the ramp front of the marking pulse before any of the other diodes fires. For purposes of explanation, assume that diode 34 of switch SW1 fires before the other diodes, such as the PNPN diode of switch SW2 at crosspoint CP2. Responsive to the firing through of PNPN diode 34 the potential difference across diode 34 and consequently, all parallel diodes is substantially reduced.

The firing through of diode 34 establishes a supervisory current path from marked supervisory lead S through conductor 33, coil 35 bridged by zener diode 36, PNPN diode 34, lead 39, capacitor 41 and resistor 42 in parallel to potential at battery 43. Because of the inductive characteristics of coil 35, the initial current flow occurs mainly through zener diode 36 in the parallel combinations of the coil 35 and diode 36. Thus, in the initial condition the circuit has the same characteristics as the crosspoint circuitry in the above noted copending application. That is, the supervisory crosspoint switch effectively includes the series combination of a PNPN diode and a zener diode.

It should be noted that standard diodes could be used in the place of the illustrated zener diode. The requirement is that the voltage drop across the diode be greater than the IR drop across the coil when the reed relay operates.

After the PNPN diode 34 switches through a potential is applied to bus B1. The applied potential is equal to the voltage drop across resistor 42 and capacitor 41 and has a ramp front caused by the capacitor 41. This potential is applied to all of the supervisory crosspoint switches on a horizontal such as horizontal 23, of an intermediate matrix. Responsive to the ramp front potential one of the PNPN diodes connected to horizontal 23 will switch through. FIG. 1 assumes that the PNPN diode in crosspoint CP2 switches before any of the other diodes. In a like manner, one of the PNPN diodes associated with horizontal multiple 25 switches through to connect the marked input to line 22 through selected line 22 over a previously traced circuit.

The link circuit provides a voltage source to the switched over supervisory path which maintains the current flow. Means, such as reed relay contacts, are provided for connecting the horizontal speech conductors to the vertical speech conductors responsive to the current flow through the series coils in the supervisory current path.

Figure 3:
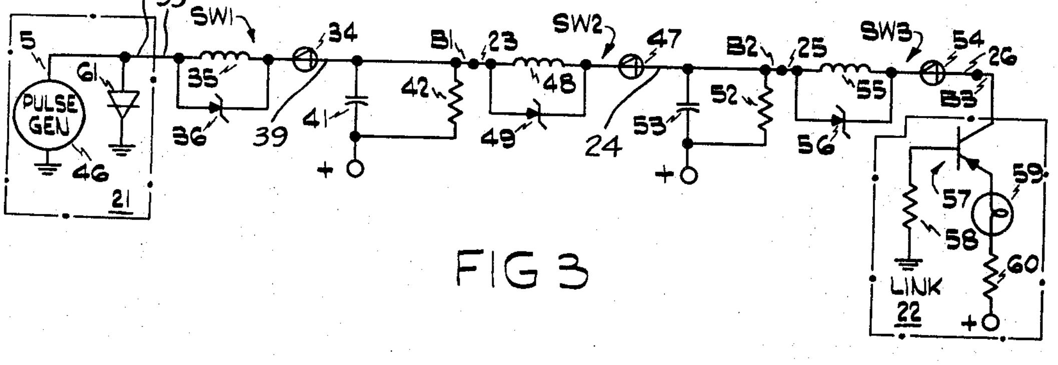
FIG. 3 schematically shows an exemplary supervision path through the electronic matrix.

The supervisory path is best shown in the simplified schematic of FIG. 3. As shown therein, the supervisory path previously described with the aid of FIGS. 1 and 2 comprises marking means, such as pulse generator 46, shown connected via lead S to conductor 33 of the primary matrix. Conductor 33 leads to switch SW1 which comprises PNPN diode 34 in series with reed relay coil 35 bridged by diode 36. The switch is connected to positive battery through resistor 42 bridged by capacitor 41. The primary matrix is connected to the intermediate matrix through bus B1 coupled to horizontal conductor 23. In a similar manner, the intermediate matrix is coupled to the secondary matrix through bus B2 and multiple 25. The switches all are alike in construction. Thus, the switch SW2 in the intermediate matrix comprises PNPN diode 47 in series with coil 48 bridged by diode 49. The other side of PNPN diode 47 is coupled to positive battery through the parallel combination of resistor 52 and capacitor 53. The PNPN diode 47 is also coupled to bus B2.

The secondary supervisory crosspoint switch SW3 comprises the PNPN diode 54 in series with the parallel combination of coil 55 and diode 56. The other end of the PNPN diode 54 is connected to bus B3 through vertical multiple 26.

The bus B3 is connected to the pre-allotted link 22 in any manner well known to those skilled in the telephony art. See, for example, the previously mentioned U.S. Patent No. 3,201,520 and U.S. Patent No. 3,221,106 which was filed on March 22, 1962 issued on November 30, 1965 and is entitled "Speech Path Controller." Both patents are assigned to the assignee of this invention.

Link 22 is comprised of a means for switching a positive battery potential to mark a bus, such as bus B3. Transistor 57 for example provides the necessary switch. The collector of transistor 57 is connected to bus B3. The base is connected to ground through biasing resistor 58. The emitter is connected to positive battery through a temperature variable resistance element, such as incandescent bulb 59, in series with resistor 60.

Before the line circuit 21 is actuated to operate the switching network, the positive battery connected to the supervisory conductors of each matrix has insufficient potential to cause the PNPN diodes to switch through. When the line circuit 21 is activated, such as when a calling party removes the handset from the hook switch or the line is marked by a finder as the called line, the pulse generator 46 applies a negative going pulse to conductor 33. The negative going pulse is sufficient to switch PNPN diode 34. At the instant PNPN diode 34 switches over, current flows from positive battery through the circuit comprising capacitor 41 and resistor 42 in parallel, diode 34 and the parallel combination of coil 35 and diode 36 to the negative pulse on conductor 33. Because of the inductive characteristics of coil 35 most of the current flows through diode 36 at this time. Accordingly, contacts **35*a*, 35*b*** remain open.

As capacitor 41 charges, the potential at bus B1 changes from positive battery and approaches the negative pulse voltage. As the voltage becomes increasingly negative, PNPN diode 47 is biased to conduction. When diode 47 fires on the ramp front voltage on B1, a circuit is completed from positive battery through the parallel combination of capacitor 53 and resistor 52 through PNPN diode 47, the parallel combination of coil 48 and diode 49 to conductor 23.

Because of the inductive characteristics of coil 48 most of the current initially flows through diode 49. Accordingly, the contacts associated with coil 48 remain open at this time.

Responsive to the switch over of PNPN diode 47 to the conducting state, the voltage on bus B2 goes from the positive battery potential and approaches the negative pulse voltage. The voltage wave at bus B2 has a ramp front because of the characteristics of capacitor 53.

At some point along the ramp front voltage on bus B2, the PNPN diode 53 switches over to conduct establishing a circuit that extends from positive battery through resistor 60, lamp 59, transistor 57, bus B3, conductor 26, diode 54, the parallel arrangement of coil 55, and diode 56, conductor 25, to bus B2.

Due to the inductive characteristics of coil 55, most of the initial current flows through diode 56 in preference to coil 55. Therefore, the contacts associated with coil 55 are not operated at this time.

Pulse generator 46 transmits a one shot pulse. When the pulse voltage returns to zero, the PNPN diodes remain operated over the circuit that includes diode 61 connected to ground in the line circuit. In greater detail, since the PNPN diodes characteristically require much lower potential to be held in the conductive state than they require to be switched to the conductive state. Accordingly, a circuit extends from positive battery through resistor 60, lamp 59, transistor 57, multiple bus B3, multiple 26, PNPN diode 54, the parallel combination of coil 55 and diode 56, multiple 25, bus B2, multiple 24, PNPN diode 47, the parallel combination of coil 48 and diode 49, multiple 23, bus B1, multiple 39, multiple 19, PNPN diode 34, the parallel combination of coil 35 and diode 36, conductor 33 of multiple 18 and sleeve lead S of line circuit 21 through diode 61 to ground.

The current flowing through this circuit causes voltage drops across the diodes 36, 49 and 55 that bridge the various coils. Responsive to the potential drop across these diodes, current is driven through the coils that is sufficient to operate the contacts associated with the coils from the normally open to the closed position. The control circuit will remain operated until D.C. is disconnected from the cross-points in any well known manner, such as disclosed in the above noted patents.

A path is established from link 22 to a called line, such as line 62, when the called line circuit is marked responsive to the digits dialed by the calling part. This connection is shown by the heavy inked lines of FIG. 1. It should be understood that numerous other paths could have been chosen through the matrices.

The switching system disclosed herein is capable of closing relay contacts using a minimum of pulse supply power. In addition, a path through a relay matrix is selected in less than 50 milliseconds without the necessity of using ferrite cores. This feat is possible because the supervisory control circuit path can be established in approximately 35 microseconds. This path remains completed until the end of the call. Thus, the relay coils which have an operating time in the millisecond range have ample time to establish the signal path.

The signal path can use multiple contacts at each crosspoint. This, of course, aids in the elimination of noises which are inherently present when the supervisory and the signaling circuits share the same path.

While the principles of the invention have been described above in connection wtih specific apparatus and applications, it is to be understood that this description is made only by way of example and not as a limitation on the scope of the invention.

I claim:

1. An electronic switching network comprising a plurality of horizontal and vertical multiples arranged to provide intersecting crosspoints, electronic crosspoint switch means connected across the multiples at each intersection, each of said crosspoints comprising a series circuit including a four layer diode and a winding for operating at least one glass reed relay contact, means comprising a capacitance device connected to each of said vertical multiples for causing said network to extend self-seeking, current controlled paths through said network for supervising switching in said network, the current in said winding building relatively slowly after completion of said path whereby said relay operates after a discrete interval of time, and means responsive to operation of said relay for completing a principal switch path through said network for carrying intelligence signals.

2. A switching network comprising a plurality of cascaded matrices having inlets and outlets, and paths therebetween, said paths comprising the horizontal and vertical multiples of the cascaded matrices, each of said multiples comprising a plurality of conductors, first crosspoint means comprising reed relay contacts for coupling together conductors in said horizontal and vertical multiples, second crosspoint means comprising reed relay coil means extending from said horizontal to said vertical conductors, non-inductive bridging means connected in parallel to each of said reed relay coil means, means for marking a desired one of said outlets, means for energizing one of said inlets, and PNPN diode means in series with said reed relay coil means in said second crosspoint means operated responsive to said marking and said energization to perform a self-seeking search for a path for controlling the flow of current through said coils to complete communication paths through said network from said energized inlets to said marked outlets.

3. The switching network of claim 2 wherein said non-inductive bridging means comprises diode means.

4. An electronic switching telephone system comprising a plurality of cascaded matrices, each of said matrices including horizontal and vertical multiples at the output of said cascaded matrices arranged to provide intersecting crosspoints, PNPN semi-conductor switching means connected between intersecting horizontal and vertical multiples at each of said crosspoints, reed relay contacts connected between intersecting horizontal and vertical multiples in each of said crosspoints, reed-relay coil means for controlling said contacts connected in series with each of said switching means, means responsive to the application of a potential of one polarity to one of said multiples at the input of said cascaded matrices for firing at least one of the PNPN devices connected thereto, means responsive to a marking of opposite polarity applied to another of said multiples for causing current flow through certain of said PNPN devices and the series coil means associated with the certain PNPN devices, means responsive to said current flow for blocking the extension of connections through all other of said PNPN devices connected to said one of said multiples unless a path is not completed through said certain PNPN devices, and diode means bridging said coil means operated responsive to the firing of said series PNPN devices for passing initial current and for supplying operating voltage for said bridged coil.

References Cited

UNITED STATES PATENTS

| | | | |
|---|---|---|---|
| 2,925,471 | 2/1960 | Licht | 179—18.7 |
| 2,962,557 | 11/1960 | Radcliffe et al. | 179—18.7 |
| 3,020,353 | 2/1962 | Heetman | 179—18.7 |
| 3,055,982 | 9/1962 | Kowahik | 179—18.7 |
| 3,184,552 | 5/1965 | Macrander | 179—18.7 |
| 3,188,423 | 6/1965 | Glenner et al. | 179—18.7 |
| 3,286,234 | 11/1966 | Hogrefe | 340—166 |

FOREIGN PATENTS

| | | |
|---|---|---|
| 1,026,306 | 4/1966 | Great Britain. |

KATHLEEN H. CLAFFY, *Primary Examiner.*

L. A. WRIGHT, *Assistant Examiner.*